(No Model.)
W. W. WINSHIP.
TORPEDO NET.
No. 485,074. Patented Oct. 25, 1892.
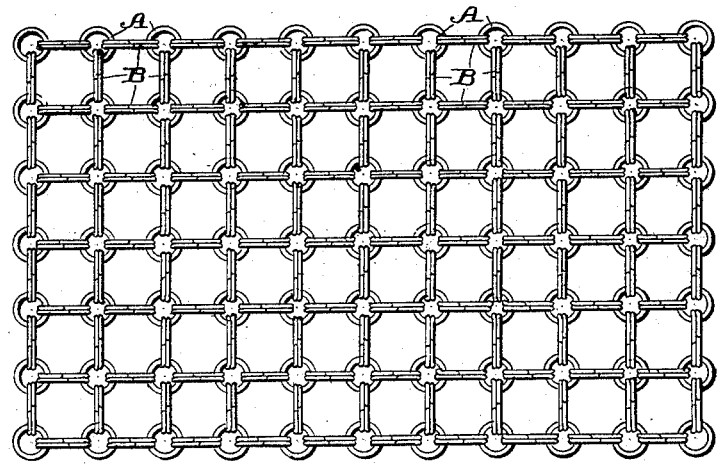
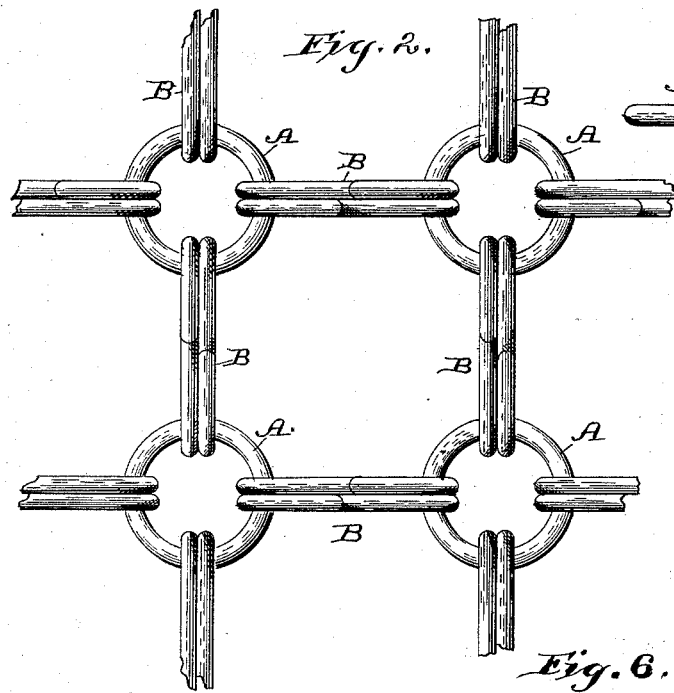
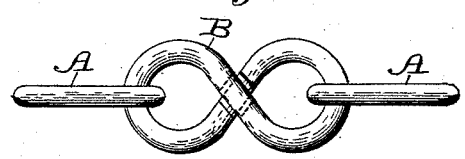
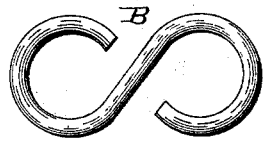
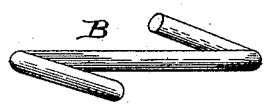
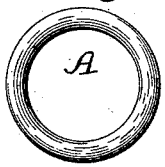
WITNESSES
Geo. E. Frech.
Roland G. Fitzgerald.
INVENTOR
William W. Winship
per
Pattison & Nesbit attys.

UNITED STATES PATENT OFFICE.

WILLIAM W. WINSHIP, OF WASHINGTON, DISTRICT OF COLUMBIA.

TORPEDO-NET.

SPECIFICATION forming part of Letters Patent No. 485,074, dated October 25, 1892.

Application filed July 29, 1892. Serial No. 441,574. (No model.)

*To all whom it may concern:*

Be it known that I, WILLIAM W. WINSHIP, of Washington, in the District of Columbia, have invented certain new and useful Improvements in Torpedo-Nets; and I do hereby declare the following to be a full, clear, and exact description of the invention, such as will enable others skilled in the art to which it pertains to make and use it, reference being had to the accompanying drawings, which form part of this specification.

My invention relates to an improvement in torpedo-nets to be used as a means of protection to ships; and it consists in the particular construction hereinafter shown and described, and particularly referred to in the claims.

The object of my invention is to produce a flexible metallic torpedo-net which is wholly composed of two mechanical devices so constructed that they can be separately carried in kegs and quickly and readily woven by the sailors into a continuous net composed of meshes when needed as a means of protection to the vessels.

The two mechanical devices composing my net are simple and exceedingly cheap to manufacture, not requiring any new machinery to produce them, as each can now be purchased in the market and applied in the manner hereinafter specified.

I will now describe the construction of the two elements composing my net, the manner of applying them, and then the particular advantages arising therefrom.

In the accompanying drawings, Figure 1 is a view of my net in elevation. Fig. 2 is a large view of one of the meshes thereof. Fig. 3 is a large view of the parts composing the net, looking at them at right angles to Fig. 2. Fig. 4 is a detached view of one of the S-hooks, showing it spread longitudinally. Fig. 5 is a similar view of one of the hooks, showing its ends separated laterally. Fig. 6 is a detached view of one of the rings.

A represents metallic rings, and B S-hooks, which have their respective ends connected to the rings to produce a net having meshes, as clearly illustrated in Fig. 1. These rings and S-hooks can be made of any desired material, but preferably of steel, which can be of any desired strength and of any desired weight, as will be readily conceived and clearly understood. So, also, it will be seen that the meshes can be made of any desired size by changing the length of the S-hooks, and the size of the rings can be varied if thought desirable, while in either event the spirit and design of my net will remain unchanged.

It will be noticed that I preferably use two S-hooks to connect the rings and to form the sides of the meshes, the object of which is to increase the strength of the net, and these S-hooks are applied in reverse positions—that is to say, the ends of one S-hook are at the opposite side from the ends of the adjacent S-hook, so that the two adjacent loops of the said hooks form together a lap-hook, thus making an exceedingly-strong connection, and thereby an exceedingly-strong net.

The net is suspended in a vertical position a suitable distance from the vessel upon booms extending horizontally therefrom, and the lower edge of the net will preferably be a little below the keel of the boat. A torpedo-net formed as herein shown and described is exceedingly flexible, (a highly-desirable feature,) and when struck by a torpedo will give before it, thus gradually offering a resistance thereto, and will wrap around and tangle the torpedo within its highly-flexible meshes, as well as deflect it from its course.

In constructing my net the S-loops are made with their ends turned laterally, as shown in Fig. 5, to allow the rings to be placed therein, or their ends can be separated from the body portion by spreading the loops longitudinally, as illustrated in Fig. 4, which will effect the same object—that of allowing the rings to be passed therein. A ring being placed within the loops of two adjoining S-hooks, the ends of the hooks are brought near the body portion by means of a pair of pinchers or by a blow from a hammer. However, while I prefer to form the loops of the hooks with their ends separated, as just described, they may be made of spring metal and the loops thereof sprung to allow the rings to enter. The advantages arising from this construction are of great practical utility. It produces a strong and durable continuous torpedo-net, which is wholly composed of only two simple and very cheap mechanical devices capable of easy attachment, thus enabling a man-of-war to carry these two devices in kegs, and when needed have the sailors weave a net of the desired depth and length, which can be accomplished in a comparatively-short time by the large number of men required to man a war-ship. It can be woven in sections and the sections then connected by the S-hooks, which will make a continuous net, all parts of it being alike. The construction also enables the net, if damaged, to be quickly and readily repaired without the help of a mechanic by putting in new rings and S-hooks to take the place of damaged or destroyed ones.

The above simple construction and advantages arising therefrom produces a torpedo-net of great practical utility for the purpose designed.

Having thus described the nature of my invention, what I claim, and desire to secure by Letters Patent, is—

1. A flexible metallic torpedo-net consisting of meshes, each mesh composed of rings forming the corners thereof and connections composed of wires having each end doubled upon itself to form loops which receive the rings, thus forming a net, as described.

2. A flexible separable metallic torpedo-net composed of rings and connections composed of wires having their ends doubled back upon themselves to form a loop at each end, the ends of the loops being movable in relation to the adjacent part of the wire, as and for the purpose specified.

3. A flexible metallic torpedo-net consisting of meshes composed of rings forming the corners of the meshes, the sides thereof being formed of two S-hooks placed together with the ends of the hooks in reversed positions.

4. A flexible metallic torpedo-net consisting of rings, the connections therefor composed of a wire or rod having its ends doubled back upon itself in opposite directions to form substantially an S, the loops thus formed catching the rings.

In testimony whereof I affix my signature in presence of two witnesses.

WILLIAM W. WINSHIP.

Witnesses:
M. R. GODDARD,
JAMES D. GODDARD.